United States Patent

Attar et al.

[11] Patent Number: 5,975,291
[45] Date of Patent: *Nov. 2, 1999

[54] APPARATUS FOR HOLDING AN ARTICLE

[76] Inventors: Shanas Attar, 1028 7th St., #202, Santa Monica, Calif. 90403; Donal Gibson, 2700 Neilson Way, #1536, Santa Monica, Calif. 90405; Sean Lawlor, 950 Second St., #107, Santa Monica, Calif. 90403

[*] Notice: This patent issued on a continued prosecution application filed under 37 CFR 1.53(d), and is subject to the twenty year patent term provisions of 35 U.S.C. 154(a)(2).

[21] Appl. No.: 08/859,141

[22] Filed: May 20, 1997

Related U.S. Application Data

[63] Continuation-in-part of application No. 08/736,132, Oct. 24, 1996, Pat. No. 5,779,040.

[51] Int. Cl.$^6$ .................................................. B65D 85/57
[52] U.S. Cl. ...................... 206/310; 206/308.1; 206/232; 206/493
[58] Field of Search ........................ 206/308.1, 309–313, 206/493, 232; 312/9.2, 9.3, 9.47, 9.48, 9.52; 220/345, 349, 339

[56] References Cited

U.S. PATENT DOCUMENTS

| | | | |
|---|---|---|---|
| 4,702,369 | 10/1987 | Philosophe | 206/309 |
| 4,771,883 | 9/1988 | Herr et al. | 206/308.1 |
| 4,807,749 | 2/1989 | Ackeret . | |
| 4,874,085 | 10/1989 | Grobecker et al. . | |
| 5,011,010 | 4/1991 | Fransic et al. | 206/308.1 |
| 5,190,153 | 3/1993 | Schultz et al. . | |
| 5,244,085 | 9/1993 | Lammerant et al. . | |
| 5,249,677 | 10/1993 | Lim | 206/308.1 |
| 5,285,897 | 2/1994 | Ozaki . | |
| 5,310,053 | 5/1994 | Lowry et al. . | |
| 5,332,089 | 7/1994 | Tillett et al. . | |
| 5,334,904 | 8/1994 | Kramer | 206/308.1 |
| 5,360,107 | 11/1994 | Chasin et al. | 206/308.1 |
| 5,366,073 | 11/1994 | Turrentine et al. . | |
| 5,377,825 | 1/1995 | Sykes et al. | 206/310 |
| 5,381,894 | 1/1995 | Misterka et al. . | |
| 5,383,554 | 1/1995 | Cowan . | |
| 5,385,235 | 1/1995 | Ikebe et al. . | |
| 5,388,713 | 2/1995 | Taniyama . | |
| 5,427,236 | 6/1995 | Kramer . | |
| 5,445,265 | 8/1995 | Herr et al. . | |
| 5,458,236 | 10/1995 | Schoettle . | |
| 5,474,174 | 12/1995 | Lin . | |
| 5,494,156 | 2/1996 | Nies . | |
| 5,497,898 | 3/1996 | Perez . | |
| 5,520,279 | 5/1996 | Lin . | |
| 5,533,614 | 7/1996 | Walker . | |
| 5,549,199 | 8/1996 | Lindsay | 206/308.1 |
| 5,551,560 | 9/1996 | Weisburn et al. | 206/308.1 |
| 5,558,220 | 9/1996 | Gartz . | |
| 5,682,988 | 11/1997 | Salisbury . | |
| 5,682,991 | 11/1997 | Lammerant et al. | 206/310 |
| 5,685,425 | 11/1997 | Choi | 206/310 |
| 5,690,224 | 11/1997 | Koizumi . | |
| 5,727,680 | 3/1998 | Liu | 206/310 |

FOREIGN PATENT DOCUMENTS

WO 92/22903  12/1992  WIPO .

*Primary Examiner*—Paul T. Sewell
*Assistant Examiner*—Luan K. Bui
*Attorney, Agent, or Firm*—Blakely, Sokoloff, Taylor & Zafman

[57] ABSTRACT

An apparatus for holding a disk-like article such as a compact disc (CD) or digital versatile disc (DVD) is disclosed. A shell has a pair of grooves inside the sidewalls. A tray for holding the compact disc has a pair of hooks which engage the grooves to allow the tray to slide into and out of the shell. The compact disc is held by a heart shaped as a cylinder including bumps around the cylinder to prevent the compact disc from sliding off the heart. Alternatively, a continuous rib may be used instead of the bumps. Another version of the heart is made of a flexible but resilient material which allows the compact disc to snugly fit over the heart. In the latter embodiment, one can remove the compact disc by pressing down onto the heart to release the compact disc.

11 Claims, 13 Drawing Sheets

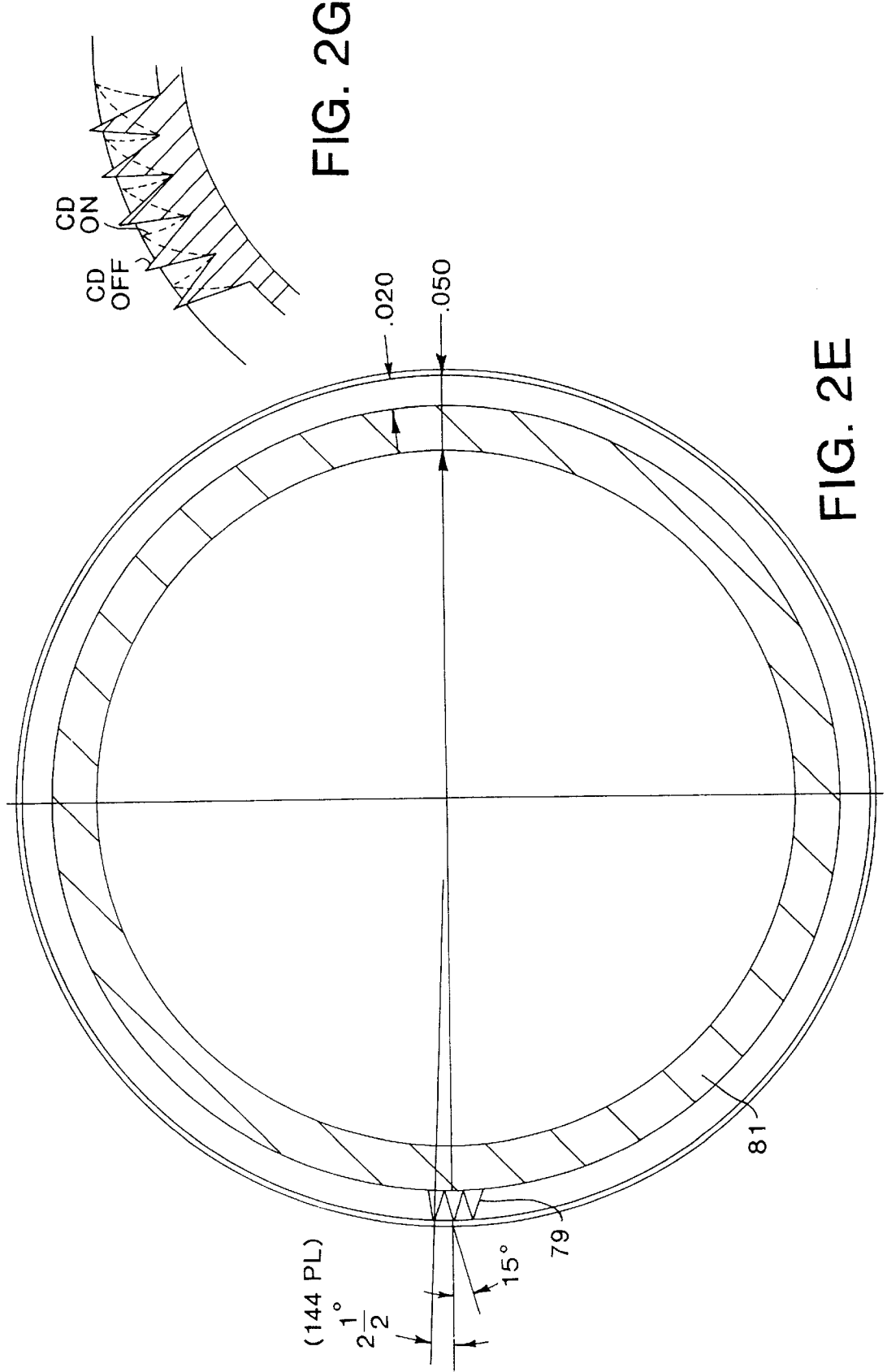

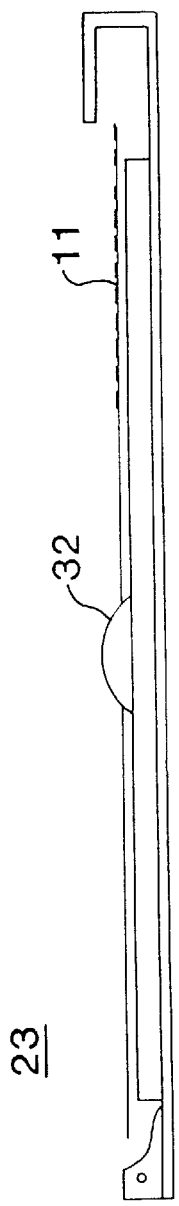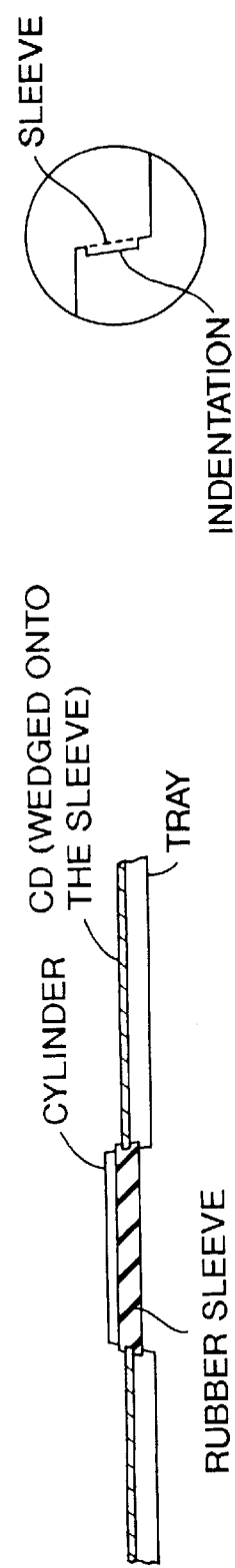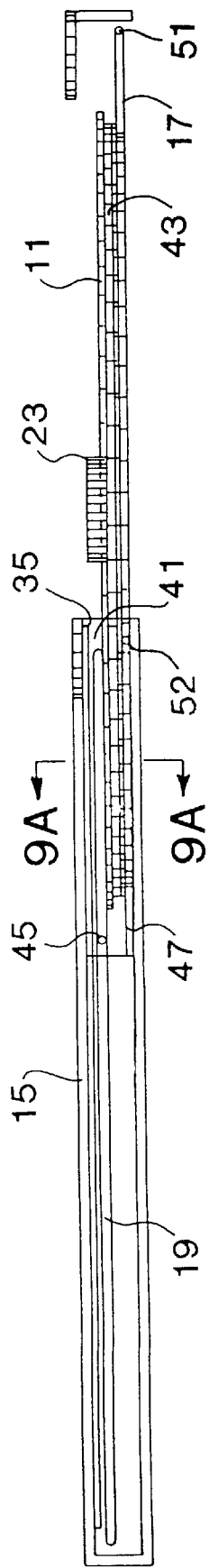

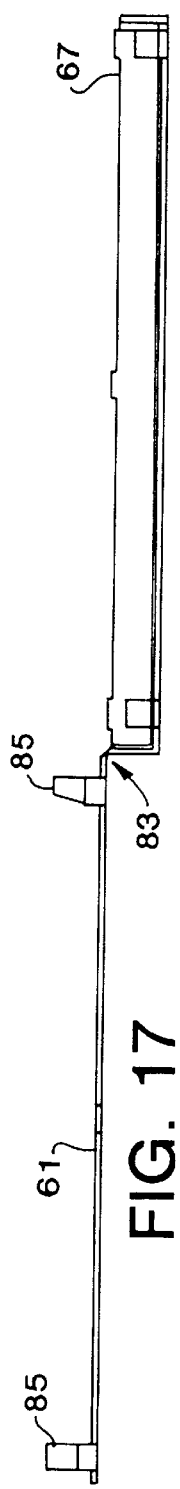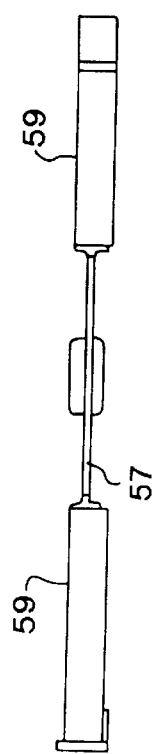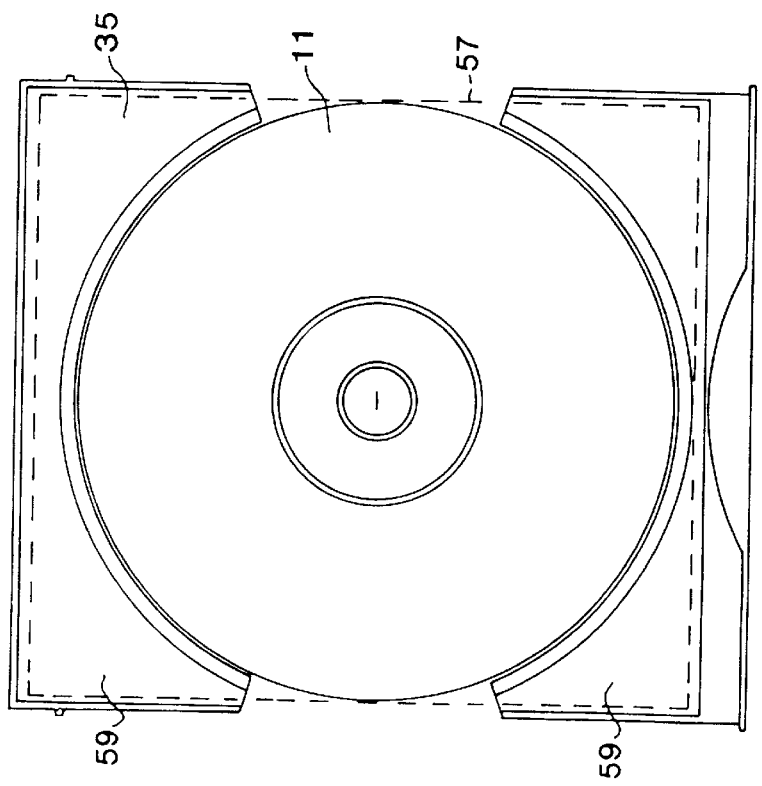

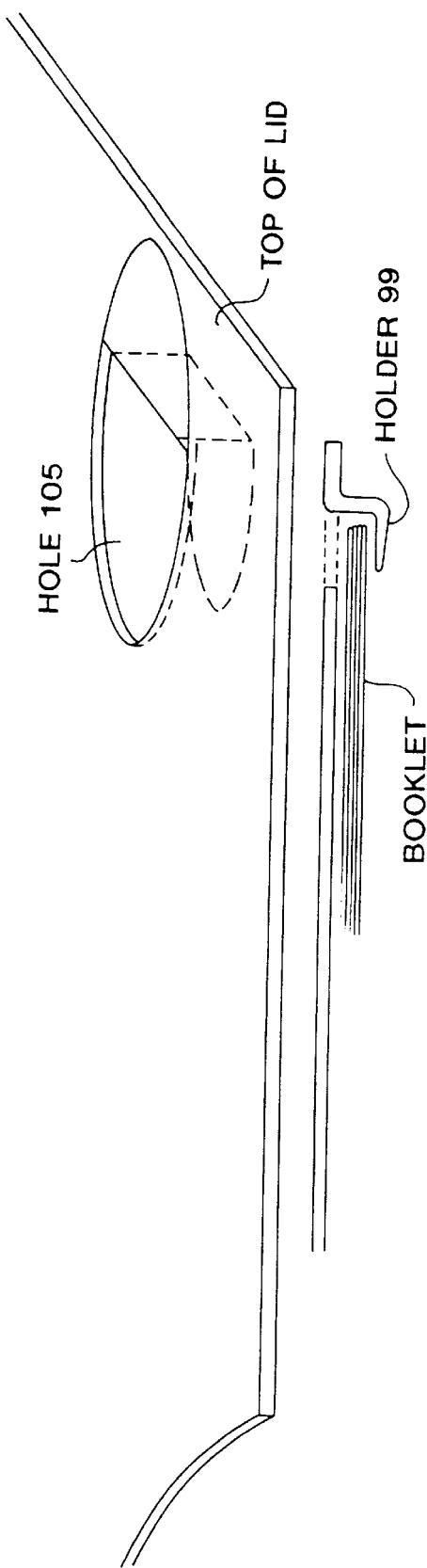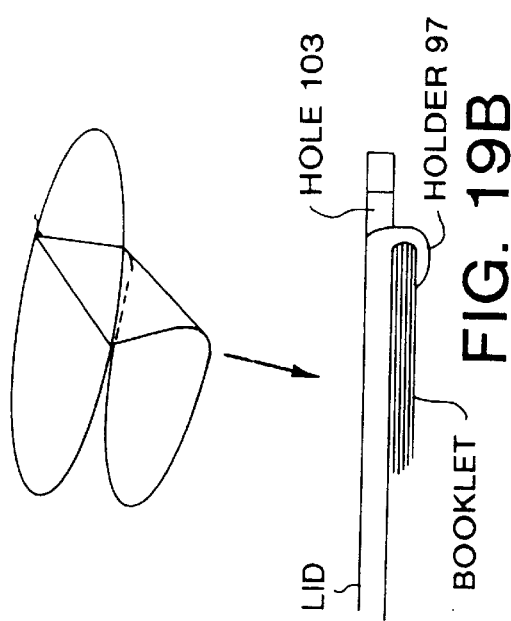

APPARATUS FOR HOLDING AN ARTICLE

This is a continuation-in-part of U.S. patent application Ser. No. 08/736,132, filed Oct. 24, 1996, U.S. Pat. No. 5,779,040.

BACKGROUND

This invention relates to containers for storing and displaying a disk-like article such as an information storage medium commonly known as a compact disc (CD).

A conventional CD holder is essentially a plastic box with a hinged lid, the so-called "jewel box" design. Swinging the lid open reveals a circular recess for receiving a CD. The user forces the CD against a circular projection at the center of the recess, causing clasps on the projection to securely grip the CD. The projection and the clasps arranged in a circle are collectively referred to as a "rosette". To remove the CD, the user typically grasps it from the sides and pulls it off the rosette.

Although in widespread use, the above described CD holder has several drawbacks. At the outset, the user may find it difficult to immediately tell which end to lift in order to open the box. Moreover, repeated opening and closing of the lid weakens the plastic hinges, eventually resulting in their breaking. To overcome this particular problem, the use of a drawer-type container has been suggested.

Another difficulty associated with the current jewel box design arises when trying to remove the CD itself. Unless the proper amount of force is applied to a precise location on the rosette at the same time the compact disc is lifted, removing the compact disc without bending it becomes virtually impossible as the clasps firmly grip the CD.

Inserting and removing the booklet accompanying the CD has also been problematic with existing jewel box designs. The tabs which hold the booklet against the lid are difficult to clear when trying to insert the booklet into place. Removing the booklet presents a no less challenging task. The booklet typically lies tightly and entirely against the lid, making it difficult to simply grab and pull out the booklet.

A new CD holder is therefore needed to overcome the above mentioned disadvantages. In particular, the CD should be easily removable from the holder by a person using bare fingers. Such a new design, however, must also be inexpensive to manufacture in large quantities, and preferably have the same outside dimensions as the current design to remain compatible with existing CD holder storage racks.

SUMMARY

In its preferred embodiment, this invention presents a CD holder having the same outside dimensions as the existing jewel box design, and using only two plastic pieces to reduce manufacturing costs. A tray holding the CD slides into a shell through an opening, the tray being guided by a pair of pins on either side of it running inside grooves which are molded into the interior sidewalls of the housing. Each pin may be attached to a support member which helps maintain the booklet concerning the compact disc against the roof of the shell. To insert the tray into the shell, the support members are pushed towards each other and held while the tray is inserted into the shell and the pins have engaged the grooves. To prevent the tray from being completely pulled out of the housing, a pair of stops are added to the grooves near the opening so that the pins abut against the stops when the tray is in its open position.

The CD itself is suspended slightly above and extending beyond a raised island on the tray and is held in place by a heart. In one embodiment, the heart has a filled cylindrical shape with a slight taper, the base of the cylinder being larger than its top. Retaining bumps or a rib may be added around the cylinder to secure the CD on the heart without substantially impairing the removal of the CD. A dual rib design for the heart allows two CDs to be suspended in the same box. In another embodiment, the heart is made of a flexible and resilient compound where the CD is pushed onto and fits snugly on the heart. By pressing down at the center of the heart, the CD may be easily pulled off the tray.

In one embodiment, three is an absence of sidewalls to the tray which allows freer access to the CD. In other embodiments, there are partial sidewalls which help maintain the tray in a horizontal position while it slides in and out of the shell while still allowing easy access to the CD.

This invention also includes a notch in the shell which facilitates removal of a booklet in the shell by grasping the booklet at its edge exposed by the notch and pulling out the booklet.

To ensure the tray remains closed, a mating bump and recess pair appears on the tray and shell, respectively.

It is expected that the invention offers the above improvements over the standard CD jewel box without any increase in manufacturing costs over that incurred with the jewel box.

DRAWINGS

The features and advantages of this invention are better understood by referring to the figures, description, and claims below.

FIG. 1 is a perspective plan view of one embodiment of this invention with the tray in an open position.

FIGS. 2A–2D, and 2F are cross-sectional side views while FIGS. 2E and 2G are top view of various embodiments of the heart.

FIG. 6 shows a bubble-shaped heart.

FIG. 7 is a side view of another embodiment of the compact disc holder.

FIG. 17 shows an exemplary embodiment of the shell with a rotatable lid.

FIGS. 18A and 18B illustrate a way to retain the booklet on the tray according to another embodiment of the invention.

FIGS. 19A and 19B show two embodiments of the stacking hole/booklet holder combination of the invention.

DESCRIPTION

Figure 1:
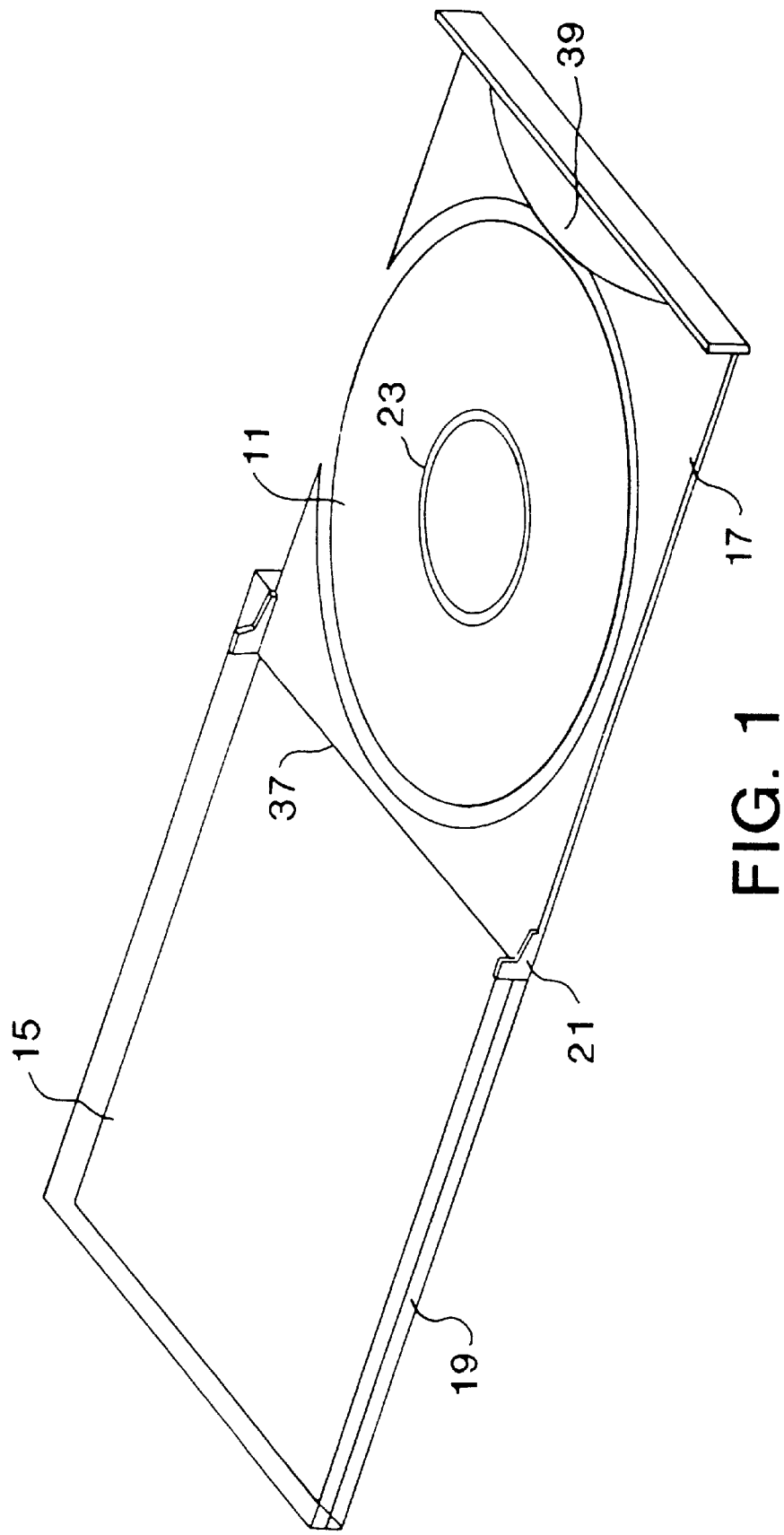
Figure 13:
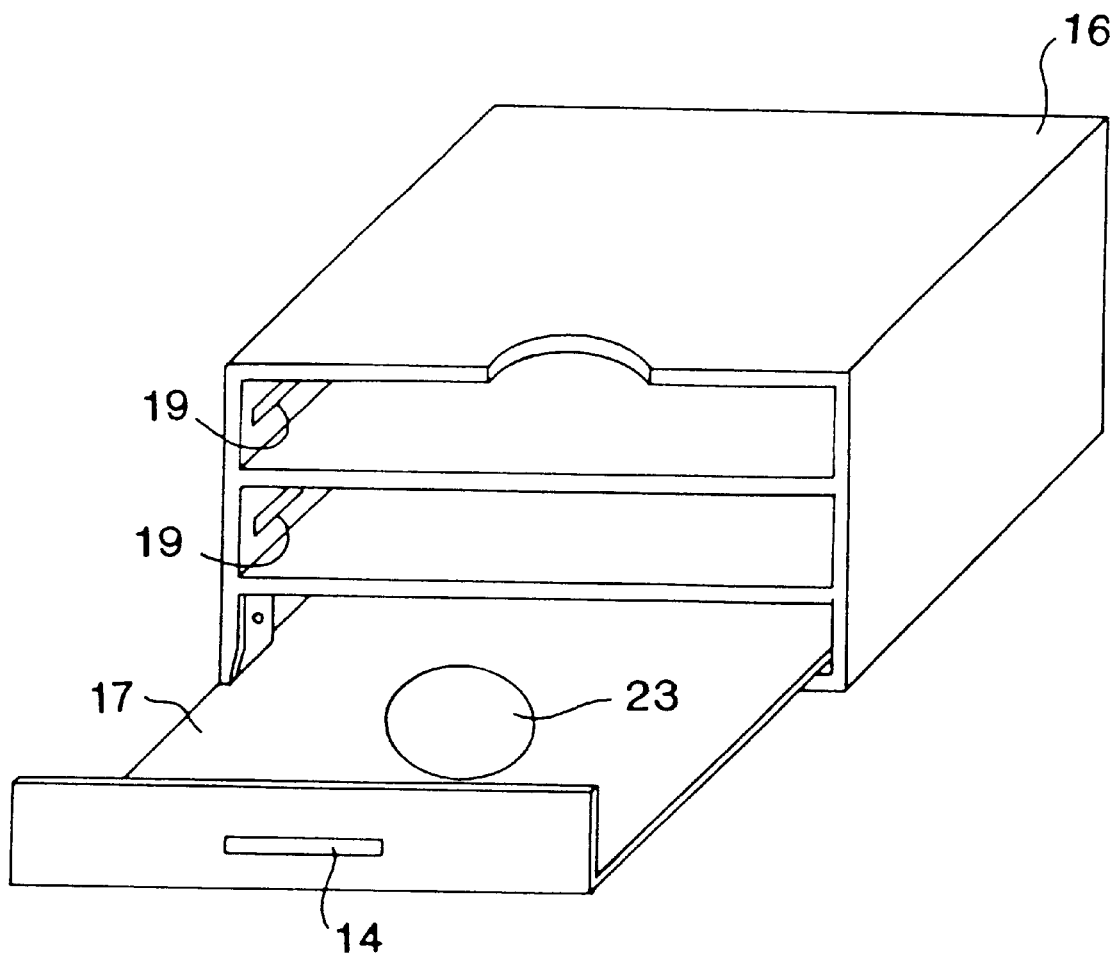
FIG. 13 shows an embodiment of the invention for holding three compact discs in three trays.

This invention relates to a holder which allows easier access to a disk-like article 11 (hereinafter referred to as CD 11) than with conventional CD holders. Referring to FIG. 1, an embodiment of the invented CD holder has a rectangular shell 15 which includes a bottom and a top separated by a left wall and a right wall, with an opening between the walls at the front of the shell 15. A tray 17 is designed to slide into the shell 15 via the front opening. The tray 17 slides along two grooves 19 formed inside the shell 15 and running substantially the length of each wall. The tray 17 has two hooks 21 formed at its rear end, each hook 21 adapted to slidably engage a respective groove 19. For holding multiple CDs, an embodiment is shown in FIG. 13 wherein the stacked shell 16 has three sets of grooves 19 allowing the use of three trays 17 (only one shown with a handle 14).

Figure 2A:

At approximately the center of the tray 17 lies a cylinder-shaped protrusion referred to herein as a heart 23. Several embodiments of the heart 23 are shown in FIGS. 2A–2F. The heart may have a straight-walled cylinder 24 as shown in FIGS. 2C and 2D, or a tapered cylinder 22 as in FIGS. 2A and 2B. The cylinders 22 and 24 can also have many small vertical ridges 20 as shown in FIG. 2A. FIG. 2E illustrates a heart having flexible and resilient teeth 79 arranged around a substantially circular hub 81. The teeth may be configured according to the exemplary dimensions shown in FIG. 2E such that they securely grip a CD by flexing and pushing against the surface of the aperture in the CD, as shown in an exaggerated fashion in the detail drawing of FIG. 2E to illustrate the gripping action. The dimensions, however, are only typical and may be adjusted by one skilled in the art for a better fit depending on factors such as the diameter of the CD aperture, the thickness (and rigidity) of the CD itself, and the material used to manufacture the teeth. An alternative to the relatively sharp teeth 79 shown in FIG. 2E is a tooth structure having a blunt edge. Materials that can be used for the teeth 79 and the hub 81 include polyurethane, polypropylene, nylon, and DELRIN™. The material selected should be sufficiently soft so as to allow some flexure of the teeth 79 as shown in the detail view of FIG. 2E.

Figure 2B:
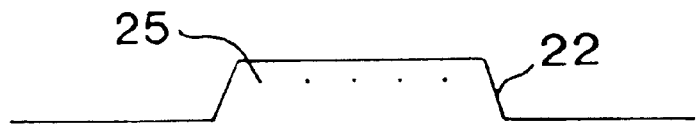
Figure 2C:
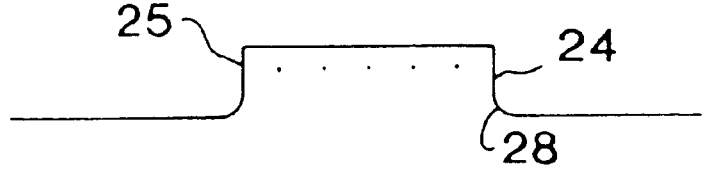
Figure 2D:
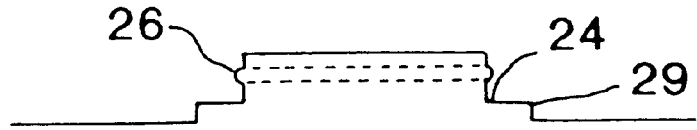
Figure 2F:
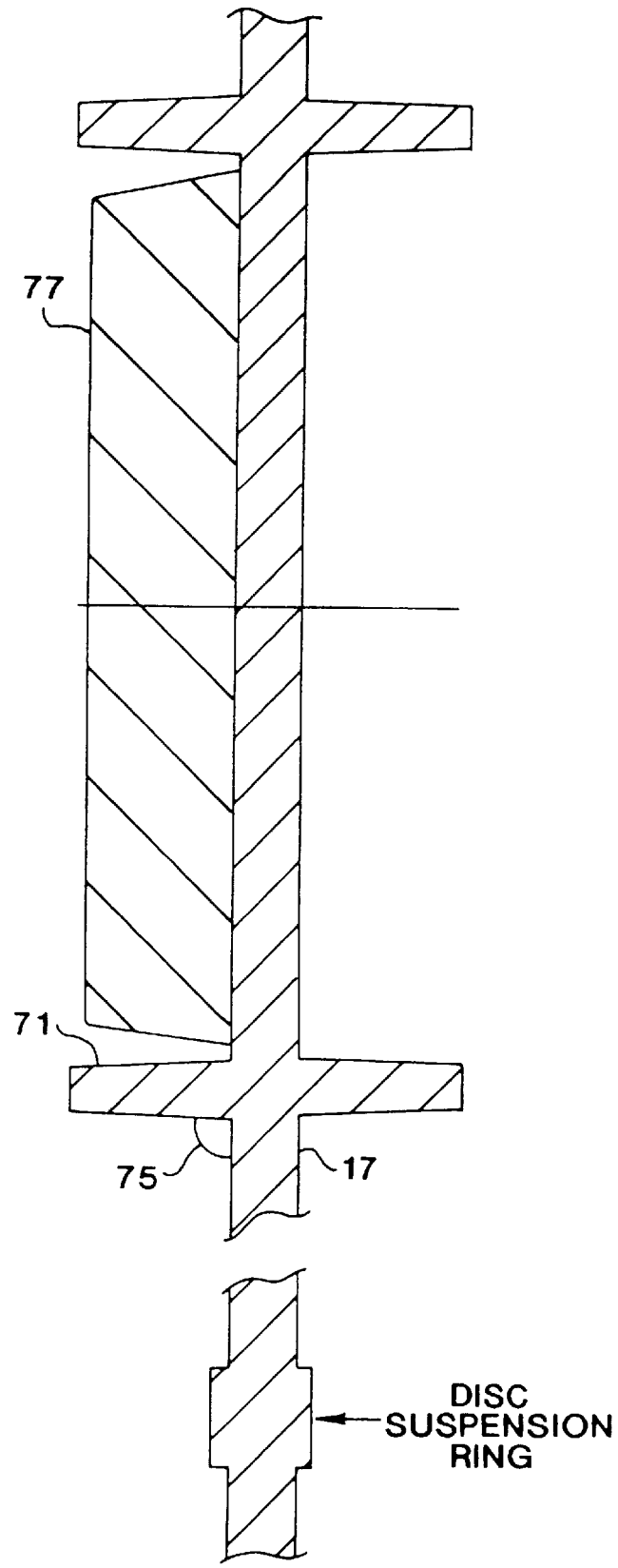

The heart shown in FIG. 2F has a smooth ring 71 disposed flat against a tray 17 and surrounding a center boss 77. The smooth ring 71 features a tapered outside circumference angled slightly inwards to define an outside angle 75 larger than 90° with the tray surface. If desired, the inside circumference of the smooth ring 71 may be made substantially perpendicular to the tray surface so as to provide some radial stiffness to the smooth ring 71 when it receives a CD. The CD slides onto the outside surface of smooth ring 71 which flexes inwards and pushes out against and secures the CD.

In one embodiment, the cylinders 22 and 24 of FIGS. 2A–2D can be made of a hard material such as the same plastic used in conventional CD holders. Using nylon or polypropylene for the particular version of the heart 23 in FIG. 2A will result in better wear and 'soft' holding characteristics. The base of the heart 23 lies against the tray 17 and is typically of a larger diameter than the central circular aperture of a CD 11. The heart 23 should not be so high as to prevent the tray 17 from smoothly sliding into and out of the shell 15. After having moved the tray 17 to an open position extending outside the shell 15, the user places the CD 11 on the tray 17 by fitting the center hole of the CD 11 over the top of the heart 23. With a tapered cylinder 22, the CD 11 fits over the cylinder and rests against the cylinder wall slightly above the tray 17 where the tapered cylinder 22 diameter is larger than that of the center hole in the CD 11. In one embodiment, the top of the heart 23 tapers inwards from the base by an annular radius of 0.75 millimeter, i.e., the top has a diameter 1.5 millimeters less than the base diameter.

FIGS. 2B and 2C also show small bumps 25 formed around the cylinders 22 and 24 to ensure that the CD 11 does not slide off the heart 23. The bumps 25 are typically rounded protrusions that are evenly spaced and can number from just a few to a dozen or more depending upon the material used and their overall shape and size. The bumps 25 should not substantially impair the placement or removal of the CD 11. They are intended to secure the CD 11 against the heart 23 in the event the holder is turned upside down or receives a jolt while being carried.

FIG. 2D shows another embodiment of the heart 23 having a continuous horizontal rib 26 circling the straight-walled cylinder 24. The rib 26 typically has a thickness of 0.25 mm and height of 0.3 mm. Once again, the idea is to prevent the CD 11 from sliding off the heart 23 without substantially impairing the removal of the CD 11.

The bumps and ribs described above can be made of the same material as the rest of the heart. Alternatively, the bumps and/or ribs can be made softer than the rest of the heart so as to require less force upon insertion and removal of the CD.

In the embodiments having a straight-walled cylinder 24 in FIGS. 2C and 2D, a flange is formed near the base of the cylinder to keep the CD 11 positioned above the tray 17. The flange may be shaped as a skirt 28 or a flat shelf 29 as shown. The CD 11 is held between the flange 29 and the bumps 25 or rib 26. The flange 29 can extend outwards up to the boundary of the CD 11 where recorded information is stored.

Figure 3:
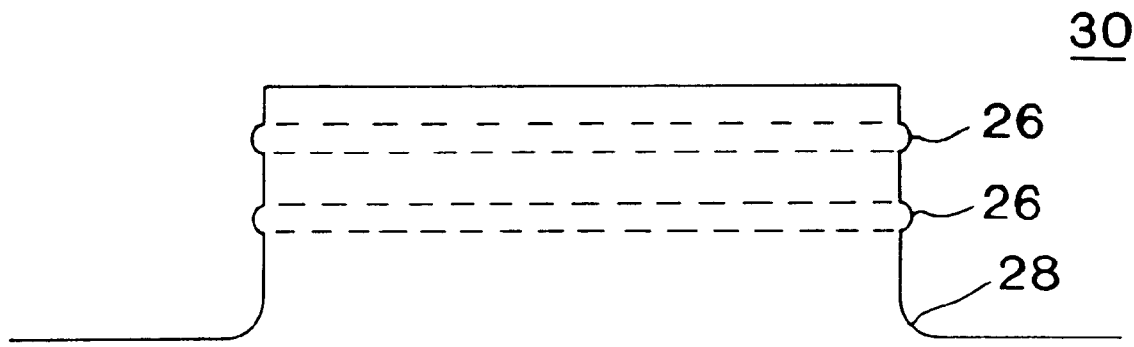
FIG. 3 is a cross-sectional view of a heart for holding two compact discs.

FIG. 3 shows a dual CD heart 30 for holding two CDs 11, a first CD 11 held between the lower rib 26 and the skirted flange 28, and a second CD 11 held between the lower and upper ribs 26.

Figure 4:
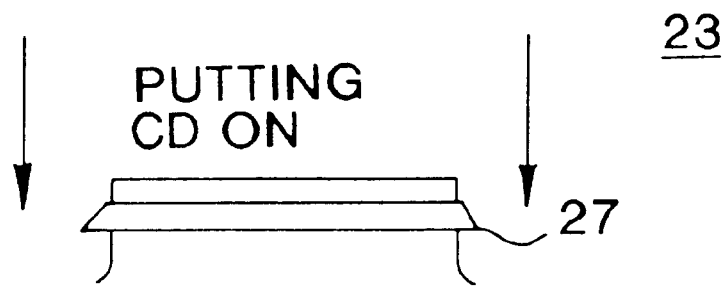
FIG. 4 shows the heart with a lip for holding the compact disc.
Figure 5:
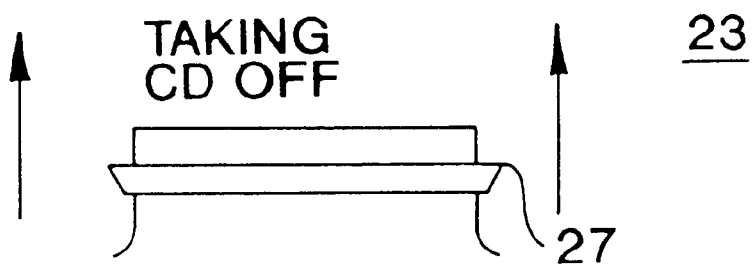
FIG. 5 shows the heart with a lip when the compact disc has been removed.

A variation of the rib 26 is shown in FIGS. 4 and 5 as a flexible lip 27. Where the rib 26 is typically made of a rigid material such as plastic, the lip 27 is formed of a rubber-like material. The lip 27 may assume two positions: down to hold the CD 11 as in FIG. 4, and up, after the CD 11 has been removed as in FIG. 5.

Other embodiments of the heart are shown in FIGS. 6A and 6B. A bubble-like portion of a sphere made of a flexible and resilient material grips the CD 11 in its center hole after the CD 11 has been pushed down upon the heart 23, as in FIG. 6A. To release the CD 11, the user presses down the bubble 32. The material used should be very flexible and resilient, capable of withstanding high temperatures such as those found inside an automobile that has been left in the sun for several hours. This same material can also be used in a straight-walled 24 version of the heart 23 as shown in FIGS. 2C and 2D.

In FIG. 6B, a rubber-like sleeve is fitted onto the cylinder. The CD is then wedged onto the outside of the rubber sleeve. The cylinder can have an indentation which receives the sleeve and helps prevent the sleeve from sliding off the cylinder when the CD is being removed.

Figure 8:
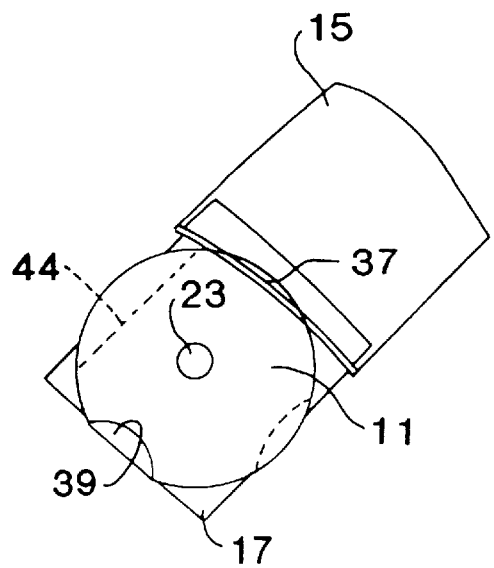
FIG. 8 is a top view of the compact disc holder.

In an embodiment of the invention shown in FIG. 7, an island 43 is formed on the tray 17 for receiving the CD 11 with the heart 23 formed atop the island 43. The island 43 is typically circular, although it may be shaped as a polygon, and allows the user to readily identify the location to place the CD 11 when the tray 17 is in its open position. The island 43 also allows the CD 11 to sit above the tray 17 so that the user can grasp the CD 11 at its edges without having to first lift the CD 11. To further facilitate grasping the CD 11, the island 43 should have a diameter slightly smaller than the CD 11 diameter such that the CD 11 extends slightly beyond the periphery of the island 43. If no island 43 is used, then the tray 17 may have a waist 44 such that the CD 11, when placed on the heart 23, could extend slightly beyond the left and right edges of the waist 44 as shown in FIG. 8.

Figure 9B:
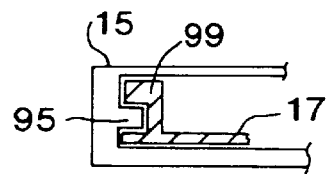
FIG. 9B is a cross-sectional view of an embodiment having a U-shaped support member.
Figure 9A:
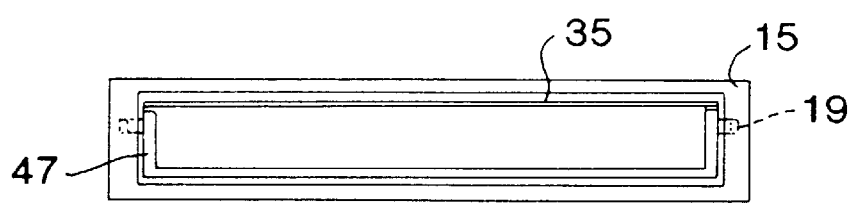
FIG. 9A is a front cross-sectional view of the embodiment in FIG. 7 cut through plane A—A'.

In addition to holding the CD 11, the invented CD holder can also carry a booklet 35 concerning the CD 11 as shown in FIGS. 9A, 10A, 10B, 10C and 18. For example, the booklet 35 may contain lyrics for songs recorded on the CD 11. With that in mind, FIG. 9A shows the shell 15 including the booklet 35. In that embodiment, the booklet 35 is inserted through the opening in the shell 15 and held between the top of the support member 47 and the roof.

Figure 10A:
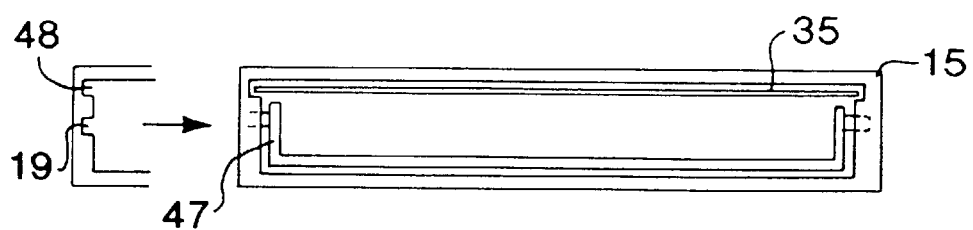
FIG. 10A is a front cross-sectional view of another embodiment similar to that in FIG. 7 cut through plane A–A'.
Figure 10B:
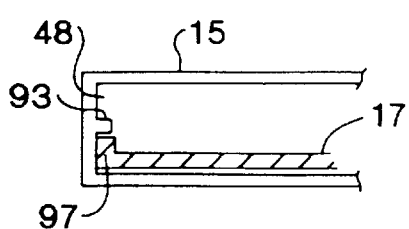
FIG. 10B illustrates another embodiment of a hook and groove combination.
Figure 10C:
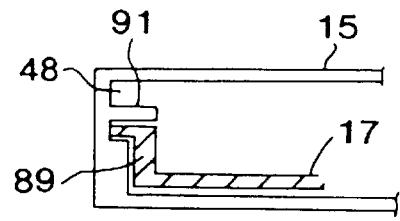
FIG. 10C shows a sliding mechanism having an upside-down L-shaped support member.

In another embodiment, the booklet 35 is inserted into a pair of second grooves 48 formed above the first grooves 19 as shown in FIGS. 10A and 10B. FIG. 10C illustrates an extended shelf 91 which should not affect the smooth sliding of the tray 17 using the support member 89. Because the second grooves 48 run uninterrupted along each wall, the booklet 35 may be inserted into place without having to clear any obstacles. To allow easy entry and insertion of the booklet 35, the second grooves 48 extend the entire way up to the opening of the shell 15 so that the user can readily identify the gap in which the booklet 35 is to be inserted.

In FIG. 10B, the booklet 35 can be inserted into a groove 48 formed between a shelf 93 and the top of the shell 15, such that tray 17 slides with the aid of support member 97 abutting against shelf 93 as shown. The shelf 93 can also be extended as in FIG. 10C to provide more support for both the booklet and the support member 89 which has an upside-down-L-shape.

Removing the booklet 35 from the shell 15 is also improved over the prior art by the addition of a curved notch 37 in the roof near the opening as shown in FIG. 8. The notch 37 exposes a portion of the booklet 35 and allows the user to grip the booklet 35 at that location and pull out the booklet 35 when the tray 17 is in its open position. A tongue 39 raised above and attached to the tray 17 mates with the notch 37 when the tray 17 is in its closed position. The tongue 39 can be made of a molded plastic as the rest of the tray, or a softer, more flexible, but still resilient material. The tongue surface can be smooth or it may have ridges and indentations to aid in gripping it. Alternatively, little bumps can be added to the tongue surface rendering it rougher for easier gripping. The tongue 39, however, should not be so large as to restrict the removal of the CD 11 from the tray 17. The tongue 39 and notch 37 may also act as a closure mechanism to keep the tray 17 in its closed position. In addition, as shown in FIG. 7, a bump 51 and recess 52 pair located on the tray 17 and shell 15 sidewall, respectively, can also be used to maintain the tray 17 closed.

FIG. 18 illustrates another way to support the booklet 35 inside the shell 15. FIG. 18A is a top view of tray 57, wherein the booklet 35 typically extends to the outer limits of the tray 57 and is held above the CD 11 by the booklet supports 59 on opposing sides of the tray 57. FIG. 18B shows a sideview of the tray 57 with the booklet supports 59.

The booklet supports 59 can be molded as raised areas in the tray 57 to maintain a one-piece construction for the tray 57. Other ways of constructing the booklet supports include molded and raised, but hollow, areas.

Another useful embodiment of the invention includes booklet holders 97 and 99 for holding the booklet 35 using L-shaped pieces that extend from the lower surface of the rotatable lid into the shell, as shown in FIGS. 19A and 19B. The L-shaped pieces can typically number four (one near each corner of a rectangular shell) and will be molded or punched into the lid such that each one leaves a hole 103 or 105 in the lid. The holes 103 and 105 are used for stacking two or more CD holders with the help of mating protrusions on the bottom of the shell.

To prevent the tray 17 from being removed completely out of the shell 15 when being pulled to its open position, a stop 41 can be provided at a fixed position in each groove to act as a stop surface for the respective hook 21. The stop 41 will preferably be formed closer to the opening of the shell 15 such that when the tray 17 has been pulled to its outermost position and the hooks 21 abut against the stop 41, the CD 11 can be easily removed from the tray 17 and will clear the shell 15 and the tongue 39.

Figure 11:
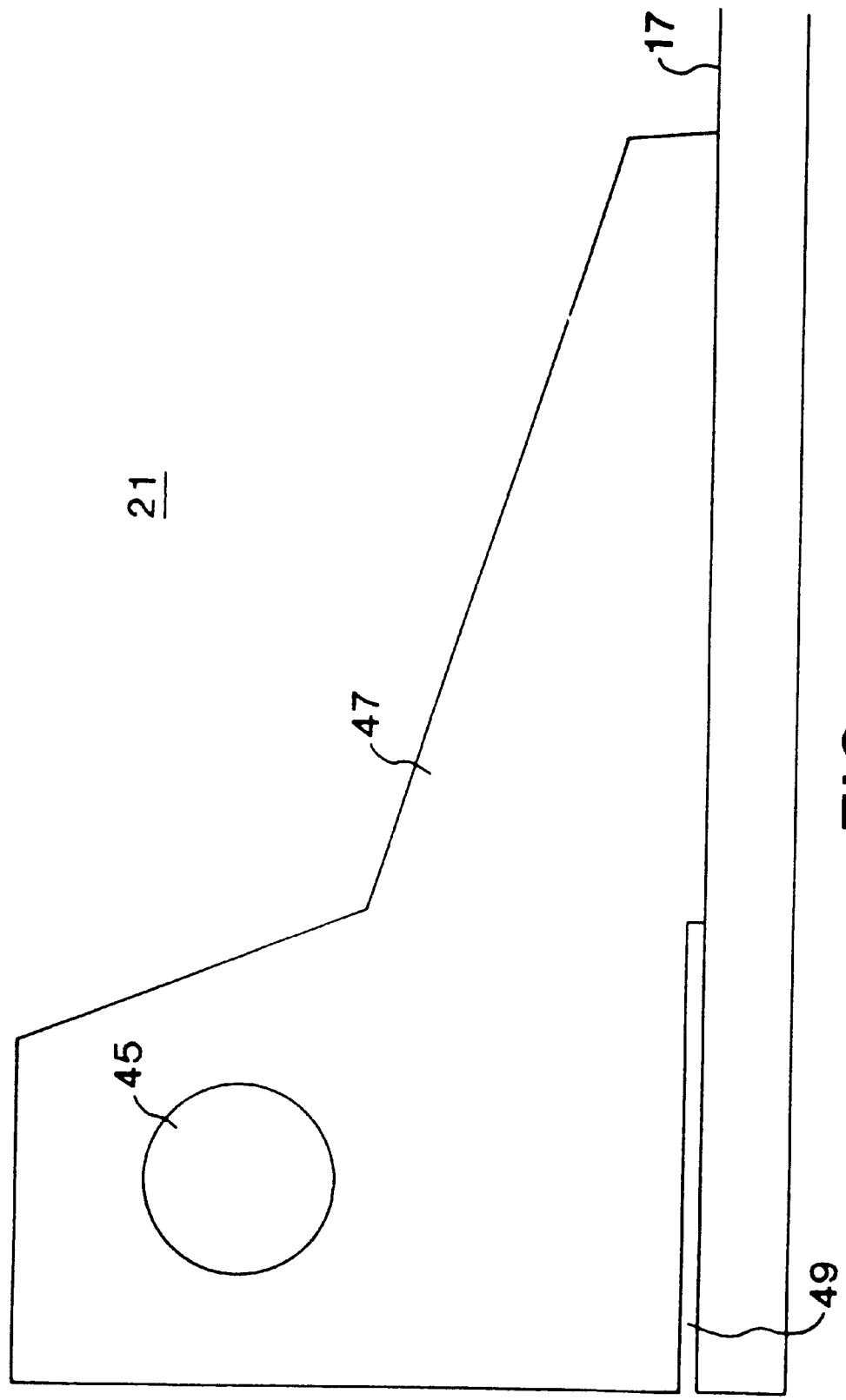
FIG. 11 is a side view of the hook.

Details concerning several embodiments of the hook 21 are shown in FIGS. 9B, 10A, 11, 12, 16A, 16B, and 16C. In one embodiment, the hook is a U-shaped extension 99 of the tray that slidably mates with an elongated wall protuberance 95 that extends the length of each wall as shown in FIG. 9B. In another embodiment, the hook 21 is a cylindrical pin 45 attached to a vertically oriented support member 47 on the tray 17, as shown in FIGS. 10A and 11. The support member 47 has a more or less trapezoidal shape as shown in FIGS. 7 and 11, and rises vertically from the tray 17 to a height slightly smaller than the inside height of the shell 15. For improving the assembly process, a small space 49 may be added between the support member 47 and the tray 17 as shown in FIG. 11 to aid in compressing the support members 47 when inserting the tray 17 into the shell 15. The support members 47 are slightly compressed inwards at the pin 45 while the tray 17 is inserted into the shell 15 until the pins have engaged the first grooves 19.

FIG. 16 illustrates other embodiments of the hook 21 and the groove 19. In particular, FIG. 16A illustrates a rounded groove 51 in a sidewall, wherein the rounded groove 51 has a curved cross-section, preferably a substantially circular cross-section having a typical radius of approximately 0.040 inches. The rounded groove 51 on each sidewall mates with a respective rounded pin 56, formed as a protrusion to fit the rounded groove 51, on support member 47 shown in FIG. 16B. The rounded pin has substantially the same radius as the rounded groove, such that in this embodiment, the rounded pin protrudes from the support member by approximately 0.015 inches as shown. The rounded groove 51 and rounded pin 56 allow the tray to slide more easily than the groove 19 of FIGS. 9 and 10 having substantially square cross-sections.

Figures 1, 16A, 16B:
FIG. 16A is a detailed view of a preferred embodiment of the groove.
FIGS. 16B and 16C are detail views of two embodiments of the hook for use with the groove of FIG. 16A.
Figures 2, 3, 16B:
Figure 16C:
Figures 1, 16D:
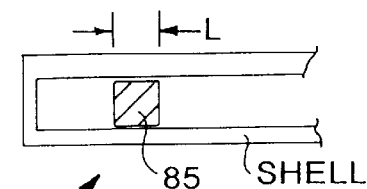
FIG. 16D shows another embodiment of the invention hook and groove combination.
Figures 2, 16D:
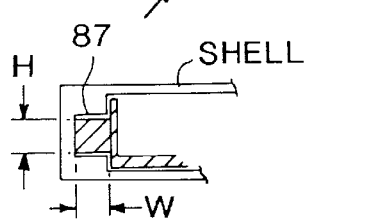

Another variation of the hook 21 and groove 19 is a rectangular stub 85 for mating with a rectangular groove 87 shown in FIG. 16D. Typical dimensions for the rectangular stub are 3–5 millimeters (mm) high and 5–7 mm long.

Another embodiment of the rounded pin 56 is shown as an elongated pin 65 in FIG. 16C where the support member 47 and rounded pin 56 are elongated. An exemplary dimension for the elongated rounded pin 65 is approximately 1 cm. in length.

To hold the booklet 35, FIG. 16A includes an additional groove 55 above the rounded groove 51, similar to groove 48 in FIG. 10.

Figure 12:
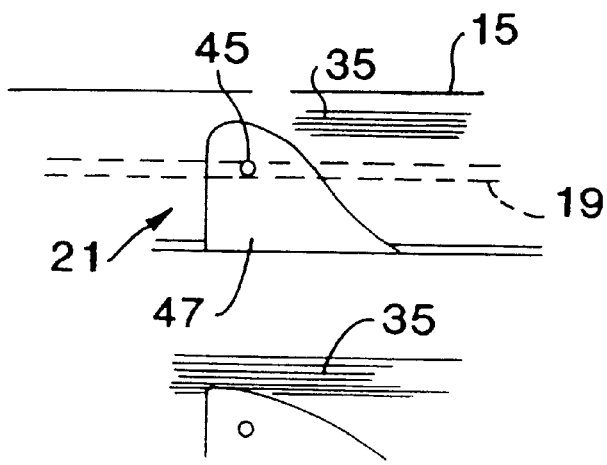
FIG. 12 shows the hook holding the booklet inside the compact disc holder.

Although the pin 45 and groove 19 combination shoulders most of the force required to maintain the tray 17 parallel to the grooves 19 in the open and closed position, the support member 47 can also assist by retaining the booklet 35 against the roof as shown in FIG. 12. To ease the insertion of the booklet 35 into place, the support member 47 has a rounded corner as shown in FIG. 12.

Figure 14:
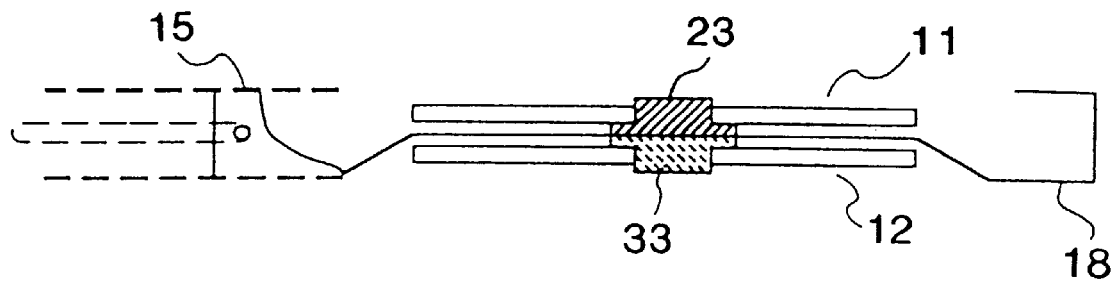
FIG. 14 is a cross-sectional view of an embodiment of the tray for holding two compact discs.

FIG. 14 shows an embodiment of the CD holder with a dual heart tray 18 wherein a second CD 12 is held on a lower heart 33 formed on the bottom side of the dual heart tray 18. The lower heart 33 can be any one of the ones discussed earlier and shown in FIGS. 2A–2F and 6. To allow such a scheme, the dual heart tray 18 has a recess in its bottom side to receive lower heart 33 and CD 12. The dual heart tray 18 also fits within original shell 15.

Figure 15:
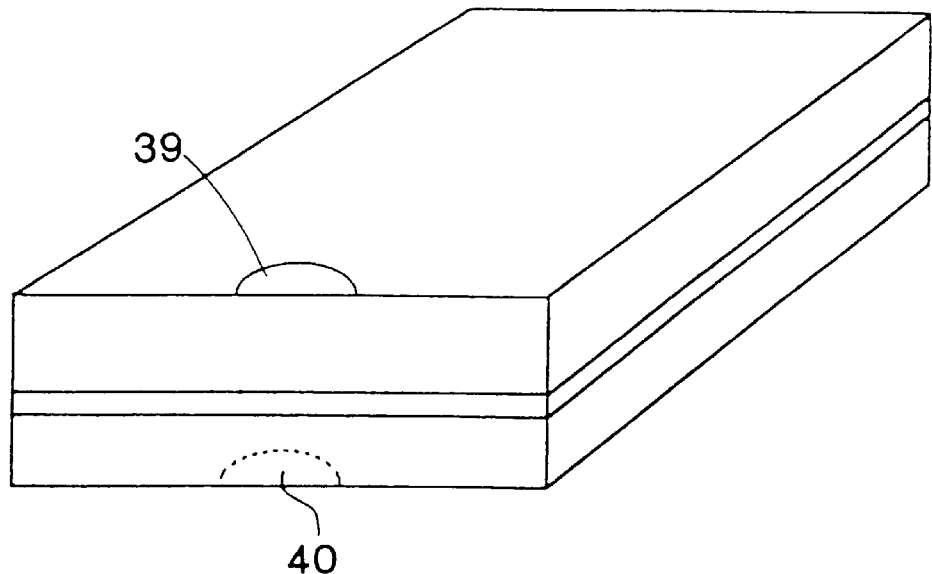
FIG. 15 is a plan view of a compact disc holder having a pair of back to back trays.

FIG. 15 shows yet another embodiment of the CD holder for holding two CDs. Two identical trays 17 are positioned back to back with the hearts facing opposite directions. This symmetrical design requires the user to turn over the CD holder and use lower tongue 40 to pull out the second tray 17. In practice, it may be possible to attach two individual shells 15 back to back to achieve the embodiment in FIG. 15.

FIG. 17 illustrates a top open shell 67 as another embodiment of the shell 15 wherein the top is a rotatable lid 61 connected to the top open shell 67 with a living hinge 83 or an equivalent. The addition of the rotatable lid 61 allows the rounded grooves 51 to be easily molded into the sidewalls of the top open shell 67. For that embodiment, the front edge 69 of the elongated pin 65 may be flat instead of curved to provide a less sticky stopping action. With the rotatable lid 61 open, tray 17 featuring elongated pin 65 with flat front edge 69 may be lowered into the shell 67 and easily snapped into the molded rounded grooves 51.

FIG. 17 shows the top open shell 67 being devoid of any grooves in the sidewalls. In this embodiment, the tray simply slides into the shell with the support members 47 shouldering the task of holding the tray parallel to the shell. For greater stability, the support members 47 can be further extended along the tray and stubs can be added to the sidewalls to act as a stop mechanism. The support members 47, however, should not extend the entire length of the tray because that would impair easy access to the CD.

In the preferred embodiment of the invention, the tray 17 (including the heart 23 and the tongue 39) or tray 57 and the shell 15 are both made of a hard but resilient plastic material commonly used in conventional CD holders such as K-resin for the shell and crystal styrene for the tray. If the rotatable lid 61 is to be opened regularly to access the CD or booklet, then K-resin would give better longevity for hinging. If the hinge is to be a "one-time" hinge for placing the tray inside the shell, then crystal styrene may be sufficient for a single hinging. Using either material allows the grooves 51 and 48 to be molded into the sidewalls. The heart can be made separately of either nylon or polypropylene and snapped into place through a slightly smaller hole in the tray, or it can be molded with the tray as mentioned earlier.

Returning briefly to FIG. 13, a shell stacking scheme is shown for holding multiple CDs. In a preferred embodiment, the shells are individual units with studs on their bases and mating recesses on their tops. The individual shells can thus be stacked by clipping the studs to their corresponding bases. The booklet 35 can lie on top of a CD, perhaps resting on the booklet supports 59 as in FIG. 18. In this way, storage of multiple CDs is made possible because the tray slides out the front of the shell, and the top of the shell need not be lifted to access the CD and its related information booklet.

An exemplary method of assembling a CD holder according to the invention includes preparing a transparent shell molded from K-resin or crystal styrene with an open rotatable lid, placing an information card against the bottom of the shell, installing a tray as in FIG. 16C, and placing one or more CDs onto the tray (and perhaps its opposite side). A title card is then placed behind the tray handle 14. An information booklet is placed into the groove 55 in FIG. 16A near the top of the shell. Alternatively, the booklet may rest freely on top of the CD, or it may be placed against the lid and held by the L-shaped pieces protruding from the bottom of the lid. Finally, the rotatable lid 61 is closed against the top open shell 67. The rotatable lid 61 may be clipped in place by molded clips 85 which may be designed to be non-removable after insertion. The tray may then be slid out to remove the booklet and/or the CD.

The embodiments of the CD holder described above for exemplary purposes are, of course, subject to other variations in structure and material within the capabilities of one reasonably skilled in the art. For example, the shell and tray can be scaled up or down together, depending on the desired outside dimensions, the size of the information booklet, or the size of the CD. Also, although the above description routinely refers to a CD as the disk-like article to be held, the invention can also be used to hold any other disk-like articles having a center hole, such as a laser disc or a digital versatile disc (DVD). Thus, the details above should be interpreted as illustrative and not in a limiting sense.

What is claimed is:

1. An apparatus for holding a disk, comprising:
    a shell defined by a left wall, a right wall, a bottom, and an opening therebetween, each wall having a first groove inside the shell running substantially the length of the respective wall;
    a lid rotatably coupled to the shell;
    a tray for holding the disk; and
    a pair of hooks connected to the tray, each hook adapted to slidably engage a respective one of said first grooves allowing the tray to be moved between a closed position and an open position inside the shell the tray resting against the bottom of the shell while substantially extending beyond the opening in the open position and substantially lying within the shell in the closed position.

2. An apparatus according to claim 1 further comprising a plurality of tabs on the lid for snap fitting the lid to the right and left walls.

3. An apparatus according to claim 1 wherein each hook comprises a support member extending upwards from the tray, the support member having an elongated protrusion adapted to slidably mate with said first groove.

4. An apparatus according to claim 3 wherein the elongated protrusion is approximately 1 centimeter long.

5. An apparatus according to claim 1 wherein said first groove has a rectangular cross-section, and each hook comprises a substantially rectangular stub adapted to slidably fit the first groove.

6. An apparatus according to claim 5 wherein said stub has a height of approximately 3–5 millimeters (mm) and a length of approximately 5–7 mm.

7. An apparatus for holding a disc having a substantially circular aperture, comprising:

a tray; and a plurality of flexible and resilient teeth each having a triangular cross-section defining a base portion and an outwardly projecting end portion, the base portions of adjacent teeth adjoining each other and being arranged around a substantially circular hub, the hub having a continuous periphery and disposed on said tray, each end portion of the teeth being configured to flex and push against a surface of the aperture upon receiving the disc.

8. An apparatus for holding a disk having a circular aperture, comprising:

a tray;

a circular hub disposed on and extending upwards from the tray; and a plurality of teeth arranged around the hub and each having first and second base portions connected to a third portion, the first base portion of one of the teeth and the second base portion of an adjacent one of the teeth adjoining each other on said hub, and the third portion extending radially outwards from the hub to contact the circular aperture of the disk.

9. An apparatus as in claim 8 wherein the teeth are made of a flexible material.

10. An apparatus as in claim 9 wherein the flexible material is polypropylene.

11. An apparatus as in claim 8 wherein the plurality of teeth have outer edges that define a substantially cylindrical boundary being tapered.

* * * * *

UNITED STATES PATENT AND TRADEMARK OFFICE
CERTIFICATE OF CORRECTION

PATENT NO.    : 5,975,291
DATED         : November 2, 1999
INVENTOR(S)   : Attar et al.

Page 1 of 1

It is certified that error appears in the above-identified patent and that said Letters Patent is hereby corrected as shown below:

<u>Title page,</u>
Please insert the following Item [73] Assignee:

-- Shanas Attar, Donal Gibson, and Sean Lawlor. Santa Monica, California.
Icon F/X, Inc. Burbank, California. --

Signed and Sealed this

Nineteenth Day of November, 2002

*Attest:*

*Attesting Officer*

JAMES E. ROGAN
*Director of the United States Patent and Trademark Office*